J. POWELL.
TRANSMISSION GEARING.
APPLICATION FILED JUNE 19, 1918.

1,396,526.

Patented Nov. 8, 1921.
2 SHEETS—SHEET 2.

Witness
Chas. L. Grieshauer

Inventor
John Powell,
By
Attorney

UNITED STATES PATENT OFFICE.

JOHN POWELL, OF ELWOOD, INDIANA.

TRANSMISSION-GEARING.

1,396,526.  Specification of Letters Patent.  Patented Nov. 8, 1921.

Application filed June 19, 1918. Serial No. 240,788.

*To all whom it may concern:*

Be it known that I, JOHN POWELL, a citizen of the United States, residing at Elwood, in the county of Madison and State of Indiana, have invented certain new and useful Improvements in Transmission-Gearing, of which the following is a specification.

This invention relates to the subject of gearing and has special reference to an improvement in transmission mechanism for motor vehicles.

To this end the invention contemplates a construction whereby all of the transmission gears as well as the differential gear mechanism may be conveniently arranged within the same casing, thus having the advantage of compactness, as well as permitting the use of fewer and larger bearings than generally possible with transmissions now in use. By reason of this feature the present transmission mechanism is particularly adapted for use in tractors, trucks, or other vehicles intended for heavy duty service, and furthermore, because of the simplicity of its design and arrangement the same may be easily handled under all conditions of use.

A further object of the invention is to provide a transmission mechanism including suitable gearing for driving a belt pulley shaft. Thus, the same is particularly useful in vehicles of the type set forth, such for instance as farm tractors wherein it is desired to use the engine or motor of the vehicle as the prime mover for other machinery or farming implements.

With the above and other objects in view, which will more readily appear as the nature of the invention is better understood the same consists in the novel construction, combination and arrangement of the parts hereinafter more fully described, illustrated and claimed.

A preferred and practical embodiment of the invention is shown in the accompanying drawings, in which:—

Similar reference numerals designate corresponding parts throughout the several figures of the drawings.

In carrying the invention into effect it is proposed, as previously indicated, to arrange the entire transmission within the same housing as the differential mechanism for the vehicle. Therefore, as will be observed from Fig. 1, the entire structure is inclosed within a suitable casing C supported on the framework F which includes the opposite longitudinally disposed frame bars 1—1 and the spaced transverse supporting beams 2 and 3, located in advance of the rear axle and differential gearing and particularly designed and adapted to have mounted thereon suitable relatively large shaft bearings 4—4$^a$ and 5—5$^a$ for receiving the various shaft elements of the transmission mechanism.

Figure 1:
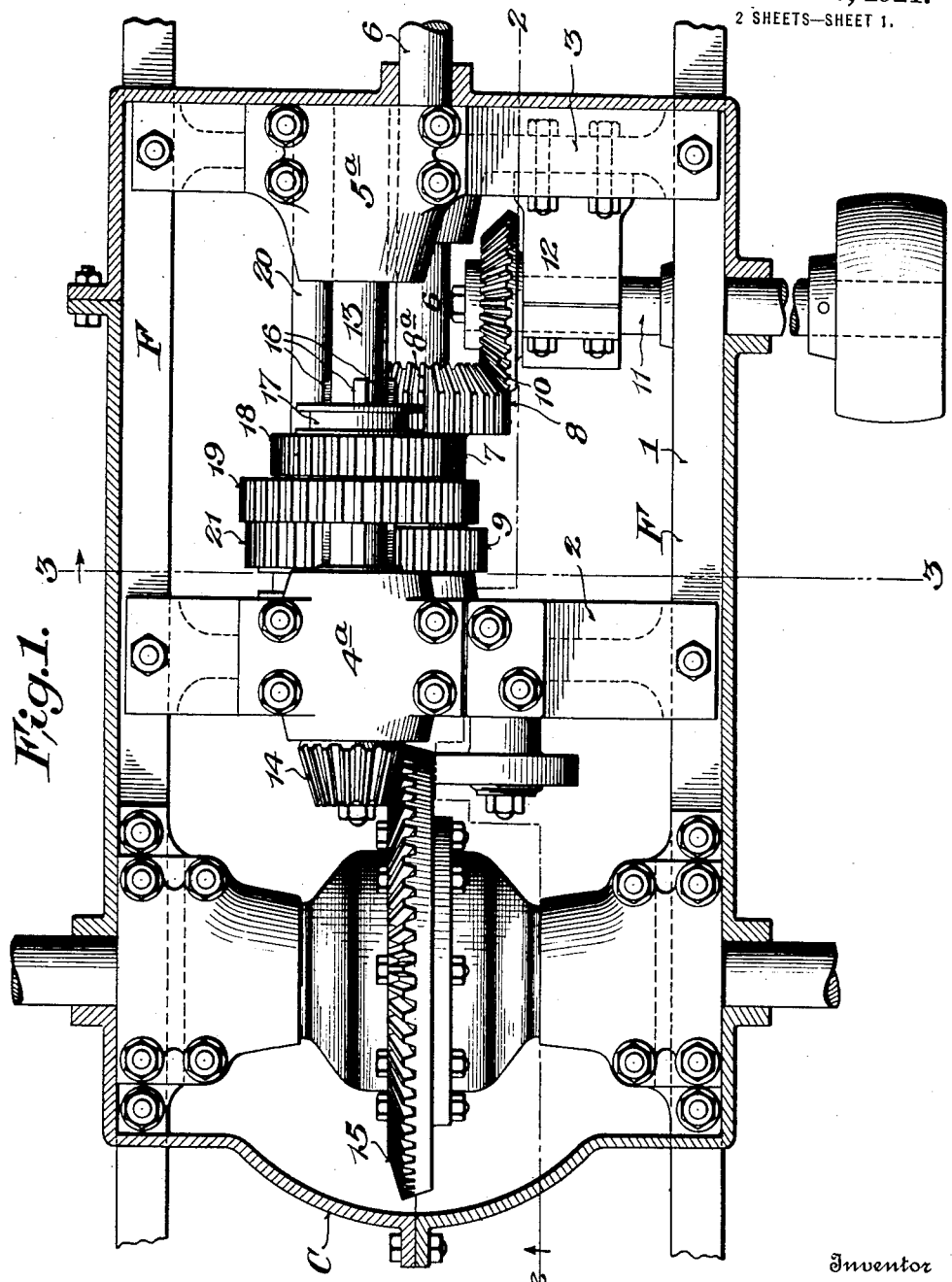
Figure 1 is a top plan view of the improved transmission mechanism with the gears meshed to "reverse."
Figure 2:
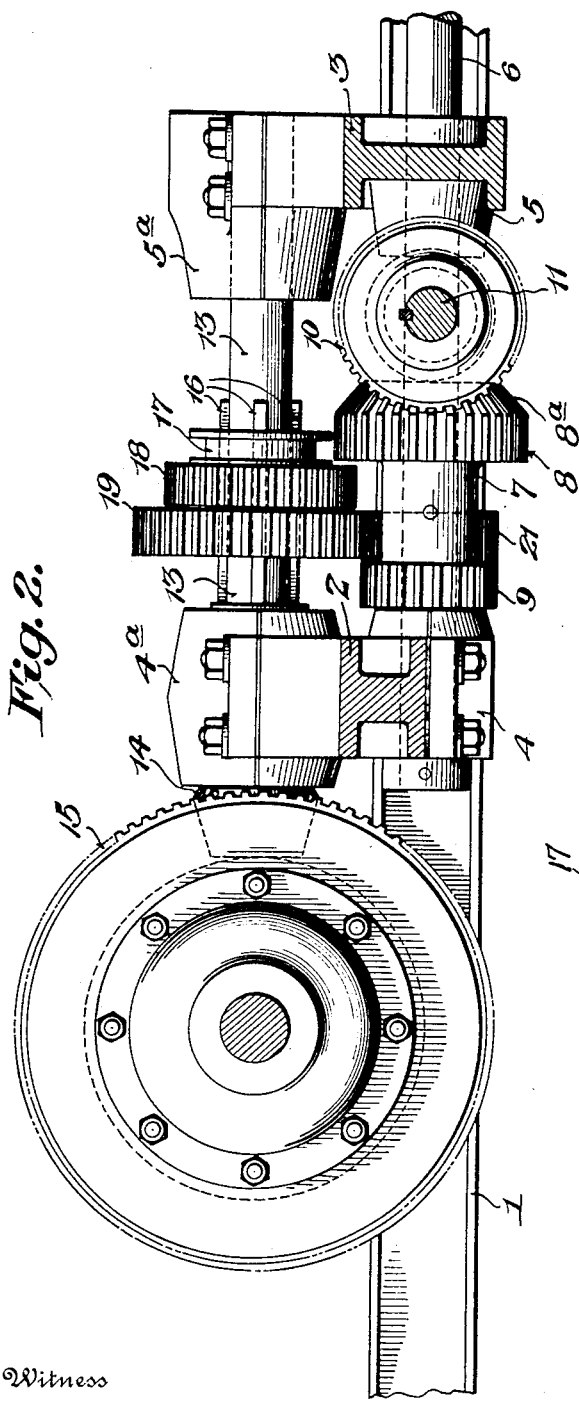
Fig. 2 is a longitudinal section on the line 2—2 of Fig. 1.
Figure 3:
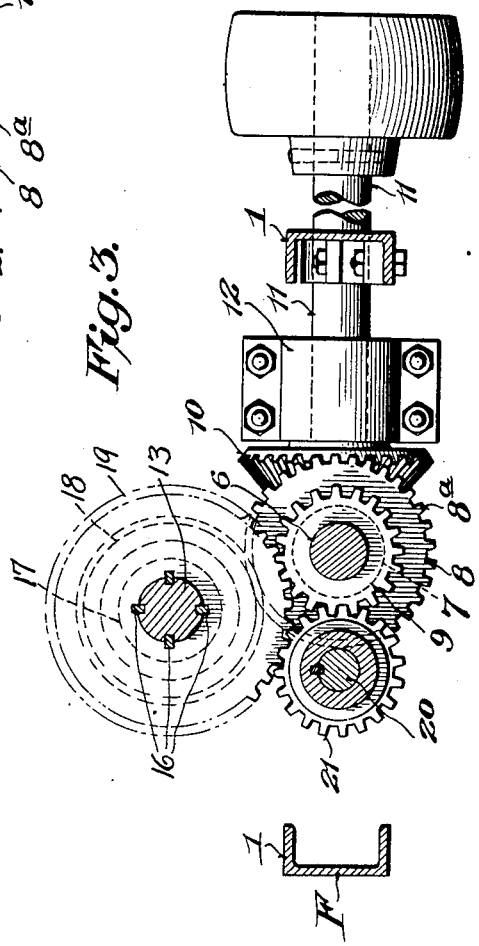
Fig. 3 is a cross sectional view on the line 3—3 of Fig. 1.

With particular reference to the structural details and gear arrangement of the present embodiment of the invention it will be observed from Fig. 1, that the main driving shaft 6 which is connected with the engine is suitably journaled in the bearings 4 and 5 and has keyed to the end thereof adjacent the bearing 4 a main driving gear unit designated generally as 7. This main driving unit constitutes one of the novel and practical features of the invention, and includes both the primary high and low speed gears carried upon a common sleeve and so spaced and arranged as to provide a so-called "neutral" space therebetween as will hereinafter more fully appear. Referring to Fig. 2 it may be readily seen that the said unit has at one end thereof a combined spur and bevel gear 8—8$^a$, the said spur portion constituting one of the gears for giving high speed forward, while the opposite end is provided with a relatively small low speed spur gear 9.

The novel formation of the forward end of the main driving gear unit above described renders the same particularly available for use in driving a belt pulley shaft and thus carry out one of the objects of the invention. That is to say, the said beveled portion 8$^a$ of the gear 8 is readily adapted to mesh with a complemental bevel gear 10 carried by a transversely disposed belt pulley shaft 11 preferably journaled in a bearing 12 carried by the beam 3 and projecting exteriorly of the housing or casing C to have mounted thereon a suitable belt pulley for transmitting power to other machinery. Thus, an exterior source of power may be provided at the side of the vehicle which renders the same particularly desirable on many occasions since it enables the vehicle to be positioned broadside or parallel with another vehicle or implement with which it is to be used.

At one side of and above the main driving shaft 6, but parallel thereto, there is provided a counter-shaft 13 the same being journaled in the upper bearings $4^a$ and $5^a$ and having at one end thereof a small driving pinion 14, preferably of the beveled type, which is adapted to mesh with the main or ring gear 15 of the differential driving mechanism. The portion of the said counter-shaft 13 between the bearings $4^a$ and $5^a$ is fitted with suitable longitudinal keys 16 whereby a shiftable power transmitting gear unit may be slidably mounted thereon in such a manner that its gear elements may be readily shifted into and out of mesh with the low and high speed gear elements of the main driving unit 7. That is to say, as will be observed from Figs. 1 and 2 of the drawings, there is slidably mounted on the shaft 13, but keyed therewith, a shiftable duplex gear unit including a shifter yoke collar 17 a high speed gear 18 and a low speed gear 19, the combined width of both said latter gears being less than the space between the gears 8 and 9 of the main driving gear unit, whereby when they occupy the position shown in Fig. 1, they will be in neutral, or in other words in the inoperative neutral space between the gears of the main driving unit.

At one side of and below the counter-shaft 13, preferably in the same horizontal plane as the main driving shaft 6, is a reverse gear shaft 20, the same having its opposite end portions journaled in suitable bearings carried by the cross beams 2 and 3. Loosely and slidably mounted on said shaft 20 is a reverse gear 21 having a yoke collar, not shown, whereby the same may be shifted longitudinally on the shaft to be engaged with the low speed gear 9 when it is desired to reverse the direction of movement of the vehicle and disengaged therefrom when the vehicle is to be driven forward. The said reverse gear 21 is preferably of a width equal to the combined width of the low speed driving gear 9 of the main driving unit and the relatively large low speed driving gear 19 of the shiftable gear unit, whereby when the latter unit is in neutral position as shown in Figs. 1 and 2 and the said reverse gear 21 is meshed with the low speed driving gear 9, the power transmitted from the main driving shaft 6 through the gears 9—21—19 to the counter-shaft 13 will cause a reverse movement of the vehicle.

Having now described the general features and arrangement of the several parts of the present transmission, reference will be made to the relative positions of the gears when the vehicle is moving forward.

When it is desired to move the vehicle forward in low speed, the reverse gear 21 is shifted forwardly from the position shown in Fig. 1 to be out of mesh with the gear 9, while on the other hand the relatively large gear 19 of the transmission gear unit is shifted rearwardly into engagement with the said gear 9. Then when it is desired to drive the vehicle forward at high speed the shiftable duplex gear unit is moved forward on the shaft 13, to cause the relatively small gear 18 to mesh with the spur portion of the gear 8. When the gears 18 and 8 are in mesh, as just set forth it will of course be apparent that the low speed gear 19 is also in mesh with the reverse gear 21 which is however, in its neutral position, that is, out of mesh with the low speed driving gear 9 of the main driving gear unit. When the entire sliding or shiftable gear unit, including the gears 18 and 19 is in its neutral position, it will of course be apparent that the reverse gear 21 may be shifted into operative relation with the gear 9 to effect the reverse of the vehicle as previously described.

From the foregoing it will be apparent that one of the novel and distinctive features of the invention resides in the provision of a main driving gear unit which consists of low and high speed driving gears connected by a suitable intermediate sleeve portion which provides a neutral space for accommodating a shiftable duplex gear unit which is shiftably mounted on a counter-shaft that furnishes power direct to the differential mechanism. Thus two relatively simple and reliable elements are provided for giving the desired two speeds forward while at the same time the said shiftable gear unit is capable of coöperating with the reverse gear which in turn may be shifted into engagement with the low speed driving gear of the said main driving gear unit to effect the reverse of the vehicle.

Also a further feature resides in the provision of the transversely disposed belt pulley shaft 11 carrying the bevel gear 10 at one end for meshing with the bevel portion $8^a$ of the gear 8, whereby when the main transmission unit including the gears 18 and 19, is in neutral, the motor which drives the main transmission shaft 6 may be utilized to drive the belt pulley shaft, and thus transmit power through the pulley carried at the outer exposed end thereof to any other implement of machinery requiring power. Therefore, this portion of the invention has the advantage in addition to those already pointed out, of driving a pulley shaft direct from the main driving gear unit of the transmission which saves gearing that would otherwise be necessary if the pulley was connected with the main driving shaft at any other point.

Without further description, it is thought that the features and advantages of the present invention will be readily understood, and it will of course be apparent that changes in the form, proportion and minor details of construction may be resorted to without departing from the spirit of the invention or the scope of the appended claims.

I claim:

1. A vehicle transmission mechanism including a driving shaft, a main driving gear unit carried by said shaft and having gears of different diameter arranged at opposite ends of the unit and providing an intervening sleeve, one of said gears having a bevel portion, a counter shaft, a shiftable gear unit carried by said counter shaft and positioned above the said sleeve of the driving gear unit, said shiftable unit including gears adapted to mesh with either of the gears of the main driving gear unit, an auxiliary power shaft disposed at right angles to the driving shaft and carrying a bevel gear adapted to mesh with the bevel portion of one of the gears of the main driving unit.

2. In a vehicle transmission mechanism the combination with the main driving shaft, of a main driving gear unit carried by said shaft and consisting of a sleeve having at one end a relatively small spur gear and at the opposite end a larger combined spur and bevel gear, a counter shaft, a transmission gear unit slidably keyed on said counter shaft and adapted to be shifted into engagement with the gears of the main driving unit, a reverse gear shaft, and a reverse gear loosely carried by said shaft and adapted to be shifted into engagement with one of the gears of the main driving unit and one of the gears of the duplex gear unit to cause a reverse movement of the vehicle.

3. In a vehicle tranmission mechanism the combination with the main driving shaft, of a main driving gear unit carried by said shaft and having spaced gears of different diameter, a counter shaft, a shiftable high and low speed gear unit carried by said counter shaft, and adapted to occupy the zone between the spaced gears of the main driving unit to be in " neutral " position, and a reverse gear of sufficient width to engage with one of the gears of the main driving unit and also with one of the gears of the shiftable duplex unit when the latter is in "neutral" to cause a reverse of the vehicle.

In testimony whereof I hereunto affix my signature in the presence of two witnesses.

JOHN POWELL.

Witnesses:
   L. SYLVEY HAWKINS,
   ELI P. MEYERS.